United States Patent
Couse et al.

(10) Patent No.: US 7,553,579 B2
(45) Date of Patent: Jun. 30, 2009

(54) SOLID OXIDE FUEL CELL STACK WITH FLOATING CELLS

(75) Inventors: Steven Couse, Calgary (CA); Zheng Tang, Calgary (CA)

(73) Assignee: Versa Power Systems Ltd., Calgary, Alberta (CA)

( * ) Notice: Subject to any disclaimer, the term of this patent is extended or adjusted under 35 U.S.C. 154(b) by 146 days.

(21) Appl. No.: 10/249,397

(22) Filed: Apr. 4, 2003

(65) Prior Publication Data

US 2004/0197636 A1  Oct. 7, 2004

(51) Int. Cl.
- H01M 2/14 (2006.01)
- H01M 2/00 (2006.01)
- H01M 2/08 (2006.01)
- H01M 8/00 (2006.01)

(52) U.S. Cl. .............................. 429/38; 429/34; 429/35; 429/36; 429/39

(58) Field of Classification Search ............. 429/34–36, 429/38, 39

See application file for complete search history.

(56) References Cited

U.S. PATENT DOCUMENTS

| | | | |
|---|---|---|---|
| 5,460,897 A | 10/1995 | Gibson et al. | 429/39 |
| 6,326,096 B1 | 12/2001 | Virkar et al. | |
| 6,492,053 B1 * | 12/2002 | Donelson et al. | 429/34 |
| 6,805,990 B2 | 10/2004 | Gorbell | |
| 2004/0131915 A1 * | 7/2004 | Sherman et al. | 429/35 |

FOREIGN PATENT DOCUMENTS

| | | |
|---|---|---|
| EP | 0 357 025 | 7/1990 |
| EP | 0 442 743 A1 | 8/1991 |
| WO | WO 2005034277 A1 * | 4/2005 |

* cited by examiner

*Primary Examiner*—Mark Ruthkosky
*Assistant Examiner*—Karie O'Neill
(74) *Attorney, Agent, or Firm*—Bennett Jones LLP

(57) ABSTRACT

A solid oxide fuel cell stack includes a fuel cell unit consisting of a fuel cell framed by a cell holder plate and upper and lower cushioning elements. The fuel cell unit is stacked with flow field seals and solid flow separator plates. The fuel cell thus floats without direct contact with rigid stack elements.

6 Claims, 3 Drawing Sheets

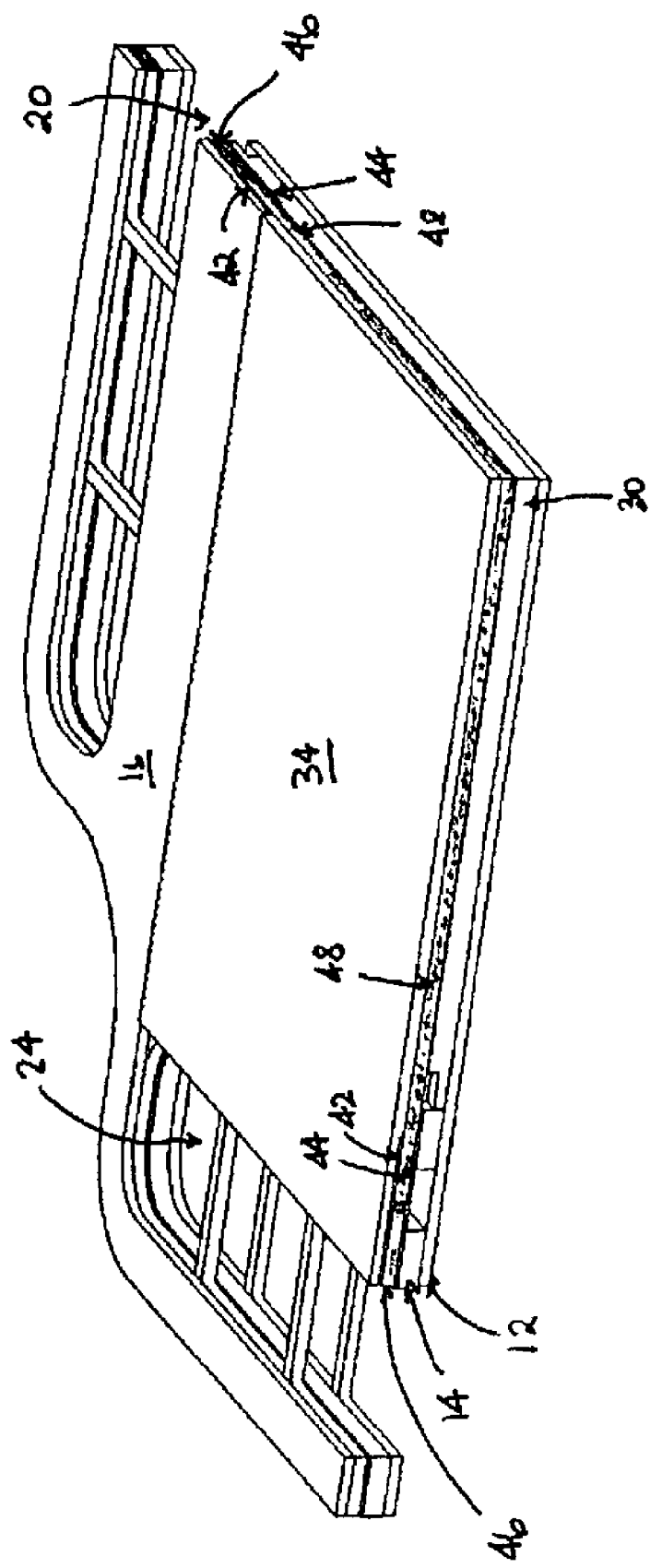

SOLID OXIDE FUEL CELL STACK WITH FLOATING CELLS

BACKGROUND OF INVENTION

The present invention relates to a solid oxide fuel cell stack configuration incorporating floating cells.

High temperature fuel cells like solid oxide fuel cells comprise an electrolyte sandwiched between a cathode and an anode. Oxygen reacts with electrons at the cathode to form oxygen ions, which are conducted through the ion-conducting ceramic electrolyte to the anode according to the reaction:

$$\tfrac{1}{2}O_2 + 2e \rightarrow O^{2-} \qquad (1)$$

At the anode, oxygen ions combine with hydrogen and carbon monoxide to form water and carbon dioxide thereby liberating electrons according to the exothermic reactions:

$$H_2 + O^{2-} \rightarrow H_2O + 2e \qquad (2)$$

$$CO + O^{2-} \rightarrow CO_2 + 2e \qquad (3)$$

The fuel cells are stacked and interleaved with interconnect plates which distribute gases to the electrode/electrolyte interfaces and which also act as current collectors.

Planar solid oxide fuel cells are believed to potentially offer lower cost and higher power densities per unit volume compared to tubular designs. However, planar SOFC designs face many challenges in materials development, processing, and system integration that must be overcome. Sealing a planar SOFC stack is a particularly difficult problem. The seals must provide sufficiently low leak rates to prevent fuel combustion in the air stream, which can lead to structural failure of the stack. The seals must also be stable over a long service life and not cause degradation or alteration of materials which contact the seals. Finally, the seals must be able to survive thermal cycling of the stack during routine operations.

Composite flexible seals have been developed which are better able to handle thermal cycling, but these seals must be compressed to provide adequate sealing performance. Conventionally in planar SOFC stack design, the sealing layer comprise seals together with a contact media between a fuel cell electrode and an interconnect or current collector plate. Balanced compressive loading on both seals and contact media of the fuel cell is then required. If the compressive loading is greater on the seals than the contact media, there may be insufficient electrical contact between the electrode, contact media and the interconnect or current collector plate to achieve good electron migration. On the other hand, if the compressive loading is greater on the contact media than the seals, shear forces may crack the fuel cell or causing leakage due to insufficient sealing.

Furthermore, even if a fuel cell stack is assembled in a "balanced manner", operation of the stack and thermal cycling may quickly unbalance the compression force in the stack, causing loss of electric contact, seal leakage or fuel cell cracking, or other problems.

Therefore, there is a need in the art for fuel cell stack configuration, which mitigates the difficulties in the prior art.

SUMMARY OF INVENTION

The present invention provides a fuel cell unit which forms part of a fuel cell stack configuration and which facilitates fuel cell stack assembly. Therefore, in one aspect, the invention may comprise a planar fuel cell unit for use in a solid oxide fuel cell stack, said unit comprising:

(a) an upper cushion element and a lower cushion element wherein each of the upper and lower cushion elements define a central cell opening; and (b) a cell holder plate having a central cell opening; and (c) a fuel cell comprising an upper electrode, a lower electrode and a central electrolyte and disposed within the cell holder plate cell opening;

(d) wherein the fuel cell and the cell holder plate are disposed between the upper and lower cushion elements such that the upper electrode is exposed through the upper cushion element opening, the lower electrode is exposed through the lower cushion element cell opening.

In another aspect, the invention may comprise a solid oxide fuel cell stack comprising:

(a) a flow separator plate having air intake and exhaust manifold openings and fuel intake and exhaust manifold openings;

(b) a lower seal element defining a cathode flow field and separate fuel intake and exhaust manifold openings;

(c) cathode contact media disposed within the cathode flow field;

(d) a fuel cell unit comprising:

i. an upper cushion element and a lower cushion element wherein each of the upper and lower cushion elements define a central cell opening, air intake and exhaust manifold openings and fuel intake and exhaust manifold openings;

ii. a cell holder plate having a central cell opening, air intake and exhaust manifold openings and fuel intake and exhaust manifold openings;

iii. a fuel cell comprising an upper electrode, a lower electrode and a central electrolyte and disposed within the cell holder plate cell opening;

iv. wherein the upper electrode is exposed through the upper cushion element opening, the lower electrode is exposed through the lower cushion element cell opening;

(e) and an upper seal element defining an anode flow field and separate air intake and exhaust manifold openings and anode contact media disposed within the anode flow field;

(f) wherein the fuel intake and exhaust manifold openings and anode flow fields align vertically to form fuel intake and exhaust manifolds and the air intake and exhaust manifold openings and cathode flow fields align vertically to form air intake and exhaust manifolds.

BRIEF DESCRIPTION OF THE DRAWINGS

The invention will now be described by way of an exemplary embodiment with reference to the accompanying simplified, diagrammatic, not-to-scale drawing where:

FIG. 3 is a cross-sectional view of the embodiment of FIG. 1.

DETAILED DESCRIPTION

The present invention provides for a solid oxide fuel cell stack made up of repeating fuel cell units layered vertically. As used herein, the term "horizontal" or "horizontally" shall refer to a plane or direction substantially parallel to the planar elements of the fuel cell stack and the term "vertical" or "vertically" shall refer to a plane or direction substantially perpendicular to such planar elements. All other terms not specifically defined herein shall have their literal or art-accepted meanings.

Figure 1:
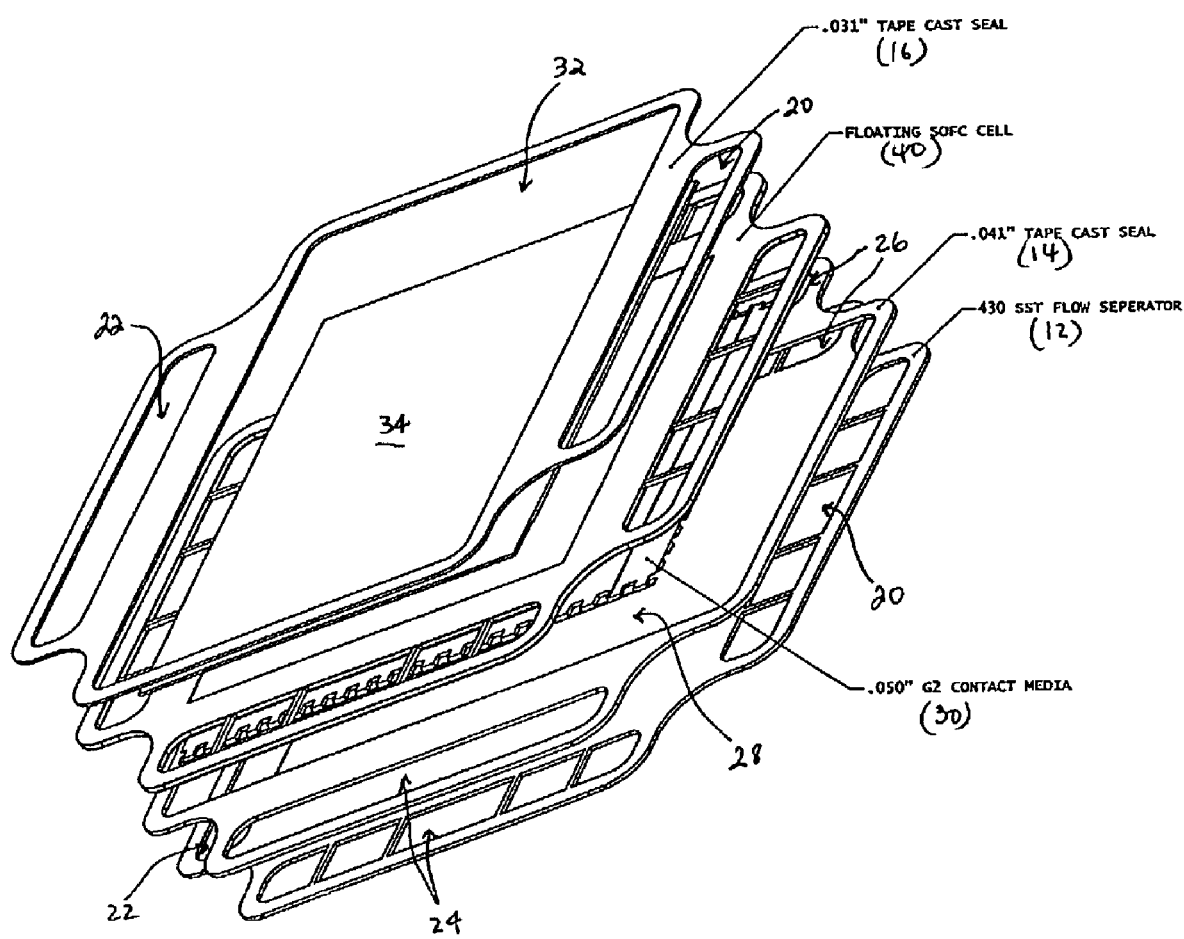
FIG. 1 is an exploded view of an embodiment of a fuel cell stack of the present invention.
Figure 2:
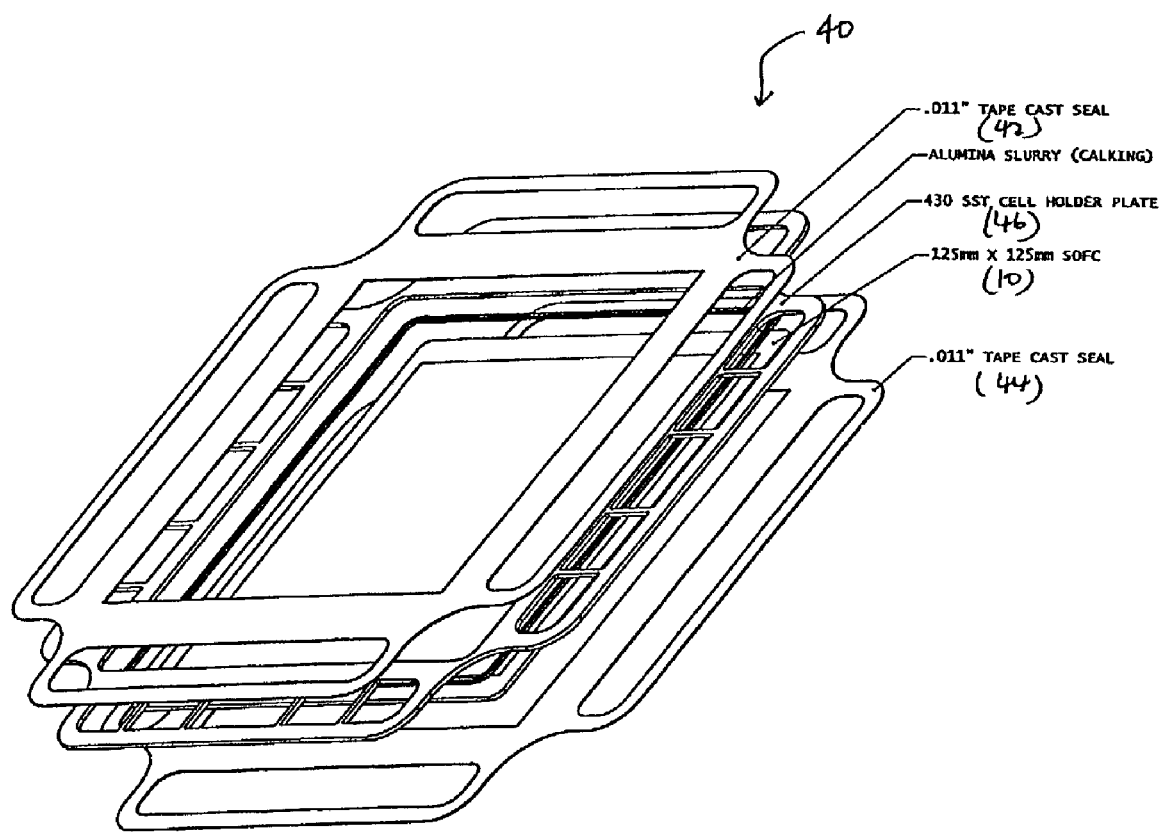
FIG. 2 is an exploded view of an embodiment of a fuel cell unit of the present invention.

In one embodiment, the invention comprises a solid oxide fuel cell stack, which is internally manifolded and has a substantially quadrilateral horizontal footprint. The stack itself is comprised of a plurality of planar fuel cells (10) and electrically conductive flow separator plates (12). The fuel cell is referred to herein as a "floating" fuel cell as it does not directly contact the rigid flow separator plates (12). Instead, it is somewhat cushioned by a combination of resilient or compressible components. Therefore, in one embodiment as shown in FIGS. 1 and 2, the stack is comprised of:

(a) a flow separator plate (12) having air intake (20) and exhaust (22) manifold openings and fuel intake (24) and exhaust manifold (26) openings;

(b) a lower seal element (14) defining a cathode flow field (28) and separate fuel intake (24) and exhaust (26) manifold openings;

(c) cathode contact media (30) disposed within the cathode flow field (28);

(d) a fuel cell unit (40); and (e) an upper seal element (16) defining an anode flow field (32) and separate air intake (20) and exhaust (22) manifold openings and anode contact media (34) disposed within the anode flow field (32).

The fuel cell unit comprises both ceramic and metallic elements, bounded on both sides by an upper cushion element (42) and a lower cushion element (44). Each of the upper and lower cushion elements defines a central cell opening, air intake and exhaust manifold openings and fuel intake and exhaust manifold openings. A cell holder plate (46) is disposed between the upper and lower cushion elements and has a central cell opening, air intake and exhaust manifold openings and fuel intake and exhaust manifold openings. A fuel cell (48) is disposed within the cell holder plate cell opening and comprises an upper electrode surface, a lower electrode surface and a central electrolyte. The upper electrode surface is exposed through the upper cushion element opening and the lower electrode surface is exposed through the lower cushion element cell opening.

The use of the fuel cell unit (40) permits the assembly of a planar SOFC stack with internal manifolding with a single compressive force for maintaining both electric contact and sealing due to fuel cell unit (40) self-leveling under a single vertical compressive force. As a result, component tolerance requirements need not be as stringent as with stack configuration which require precisely balanced compressive forces.

The fuel intake and exhaust manifold openings (24, 26) and anode flow fields (32) align vertically to form fuel intake and exhaust manifolds and the air intake and exhaust manifold openings (20, 22) and cathode flow fields (28) align vertically to form air intake and exhaust manifolds.

The fuel cell unit (40) is made up of a central layer including a cell holder plate (46) and the fuel cell (48). The cell holder plate frames the fuel cell within a central cell opening. A thin cushioning element (42, 44) overlays the cell holder plate on either side of the plate and fuel cell. These cushioning elements are preferably fashioned from the same material as the seals (14, 16) which are further described hereinbelow. In one embodiment, the cell opening of the cell holder plate is slightly larger than the dimensions of the fuel cell and an alumina paste is used to seal the gap between the two. Alternatively, the dimensions of the cell opening and the cell itself may be closely matched such that an alumina paste seal is unnecessary. The cell holder plate is preferably fashioned from a relatively rigid, corrosion-resistant material such as stainless steel.

The stack configuration shown in the attached drawings illustrate seal-defined flow fields, as described in co-pending application No. 60/319,740, the contents of which are incorporated herein by reference. However, one skilled in the art will be aware that the stack configuration is not an essential element of the invention, provided that the composite fuel cell unit (40) described herein, or an equivalent structure, is utilized along with suitable interconnect or flow separator plates.

The lower seal element has a central cathode flow field (28) which is elongated so as to provide fluid communication from the air intake manifold to the air exhaust manifold, while sealing off the fuel intake and exhaust manifolds. As a result, the lower seal element directs air across the cathode (lower) side of the fuel cell when assembled within the stack. A porous contact medium is provided within the cathode flow field, which completes electrical contact between the flow separator plate on one side and the cathode on the other side and distributes air within the cathode flow field. In one embodiment, the cathode contact medium may be a lanced offset plate such as conventional heat exchanger plates which are well known and commercially available.

The upper seal element has a central anode flow field which is elongated perpendicularly to the cathode flow field and which provides fluid communication from the fuel intake manifold to the fuel exhaust manifold, while sealing off the air intake and exhaust manifolds. As a result, the upper seal element directs fuel across the anode (upper) side of the fuel cell when assembled within the stack. A porous contact medium is provided within the anode flow field which completes electrical contact between the adjacent flow separator plate and the anode surface and which distributes fuel gases within the anode flow field. In one embodiment, the anode contact medium may be highly porous metal foam such as nickel foam or an expanded metal such expanded stainless steel.

Both the anode and cathode contact media must be electrically conductive and porous to permit gas flow to the fuel cell. One or both of the anode and cathode contact media preferably comprise a compressible or resilient material.

An electrically conductive ceramic paste may be used to enhance electrical contact between the cathode surface of the fuel cell and the cathode contact media. Lanthanum cobaltate or lanthanum cobaltate nickel perovskites may be suitable cathode contact pastes.

Upon assembly and compression of the stack, the rigid elements of the stack (the flow separator plate and the cell holder plate) do not directly contact the brittle ceramic fuel cell. The fuel cell is isolated by the combination of the anode and cathode contact media, the upper and lower seal elements and the upper and lower cushioning elements which frame the fuel cell within the fuel cell unit. Accordingly, precise balancing during compression of the fuel cell stack is not required as tolerable differences in thickness of the various stack elements are easily absorbed by the compressible elements, which isolate the fuel cell itself.

As may be seen in cross-section in FIG. 3, the thin cushioning elements (42, 44) are adjacent the contact media. In one embodiment, the cushioning elements are approximately 0.011" thick, compared to an approximate thickness of 0.043" for the fuel cell and the cell holder plate. The nickel foam may typically be 90% porous have a starting thickness of about 0.050" and is preferably pre-compressed to approximately 0.031" prior to installation. Lanced offset plate cathode contact media may have a thickness of about 0.050" and are relatively incompressible.

The seals are preferably compressible seals and may include those seals described in co-owned and co-pending application Ser. Nos. 09/931,415 or 60/319,811, the contents of which are incorporated herein by reference. Such seals may be formed by dipping alumina felts into a suspension of ceramic particles to infiltrate the felt with the particles. Alternatively, the seals may be tape cast from a slurry of ceramic fibres and particles. The preferred seals of the present invention are somewhat porous and flexible. The cushioning elements are also preferably fashioned in the same manner from the same material.

As will be apparent to those skilled in the art, various modifications, adaptations and variations of the foregoing specific disclosure can be made without departing from the scope of the invention claimed herein. The various features and elements of the described invention may be combined in a manner different from the combinations described or claimed herein, without departing from the scope of the invention.

The invention claimed is:

1. A planar fuel cell unit for use in a solid oxide fuel cell stack, stacked between upper and lower seal elements, the lower seal element having three distinct openings; a central cathode flow field opening which defines the peripheral boundary of a cathode flow field which includes an air intake portion and an air exhaust portion, a fuel intake manifold opening and a fuel exhaust manifold opening, the upper seal element having three distinct openings; a central anode flow field opening which defines the peripheral boundary of an anode flow field which includes a fuel intake portion and a fuel exhaust portion, an air intake manifold opening and an air exhaust manifold opening, said unit comprising:
  (a) an upper cushion element and a lower cushion element wherein each of the upper and lower cushion elements define a central cell opening, air intake and exhaust manifold openings and fuel intake and exhaust manifold openings wherein the fuel intake manifold opening and the fuel exhaust manifold opening of the upper cushion element are positioned within the peripheral boundary of the anode flow field, aligned respectively with the fuel intake portion and the fuel exhaust portion of the anode flow field, and wherein the air intake manifold opening and the air exhaust manifold opening of the lower cushion element are positioned within the peripheral boundary of the cathode flow field, aligned respectively with the air intake portion and the air exhaust portion of the cathode flow field; and
  (b) a cell holder plate having a central cell opening; and
  (c) a fuel cell comprising upper electrode, a lower electrode and a central electrolyte and disposed within the cell holder plate cell opening;
  (d) wherein the upper electrode is exposed through the upper cushion element opening, the lower electrode is exposed through the lower cushion element cell opening.

2. The fuel cell unit of claim 1 wherein one or both of the upper and lower cushion elements comprises a flexible, compressible seal material.

3. The fuel cell unit of claim 2 wherein the seal material comprises a porous composite material comprising ceramic fibres and ceramic particles.

4. A solid oxide fuel cell stack comprising a plurality of fuel cell units as claimed in claim 1.

5. A solid oxide fuel cell stack comprising:
  (a) a flow separator plate having air intake and exhaust manifold openings and fuel intake and exhaust manifold openings;
  (b) a lower seal element having three distinct openings; a central cathode flow field opening defining the peripheral boundary of a cathode flow field combining an air intake portion and an air exhaust portion, and separate fuel intake and exhaust manifold openings;
  (c) cathode contact media disposed within the cathode flow field;
  (d) a fuel cell unit comprising:
    i. an upper cushion element and a lower cushion element, the lower cushion element being adjacent to the lower seal element, wherein each of the upper and lower cushion elements define a central cell opening, air intake and exhaust manifold openings and fuel intake and exhaust manifold openings;
    ii. a cell holder plate having a central cell opening, air intake and exhaust manifold openings and fuel intake and exhaust manifold openings;
    iii. a fuel cell comprising an upper electrode, a lower electrode and a central electrolyte and disposed within the cell holder plate cell opening;
    iv. wherein the upper electrode is exposed through the upper cushion element opening, the lower electrode is exposed through the lower cushion element cell opening;
  (e) and an upper seal element adjacent to the upper cushion element, the upper seal element having three distinct openings; a central anode flow field opening defining the peripheral boundary of an anode flow field combining a fuel intake portion and a fuel exhaust portion, and separate air intake and exhaust manifold openings, and the upper seal element having anode contact media disposed within the anode flow field;
  (f) wherein the fuel intake and exhaust manifold openings and the fuel intake portions and the fuel exhaust portions of the anode flow fields align vertically to form fuel intake and exhaust manifolds and the air intake and exhaust manifold openings and the air intake portions and air exhaust portions of the cathode flow fields align vertically to form air intake and exhaust manifolds; and
  (g) wherein the fuel intake manifold opening and the fuel exhaust manifold opening of the upper cushion element are positioned within the peripheral boundary of the anode flow field and wherein the air intake manifold opening and the air exhaust manifold opening of the lower cushion element are positioned within the peripheral boundary of the cathode flow field.

6. The fuel stack of claim 5 wherein the cathode contact media comprises a lanced offset plate.

* * * * *